United States Patent [19]

Kuwabara et al.

[11] Patent Number: 4,880,509
[45] Date of Patent: Nov. 14, 1989

[54] ELECTROLYTIC FINISHING METHOD AND APPARATUS

[75] Inventors: Youhei Kuwabara, Fukuroi; Teruo Asaoka, Kakegawa; Shogo Yoshioka, Iwata; Haruki Sugiyama, Hamamatsu, all of Japan

[73] Assignee: Shizuoka Seiki Co., Ltd., Fukuroi, Japan

[21] Appl. No.: 264,103

[22] Filed: Oct. 28, 1988

[30] Foreign Application Priority Data

Oct. 30, 1987 [JP] Japan ................................ 62-276920
Jan. 23, 1988 [JP] Japan ................................ 63-12993

[51] Int. Cl.⁴ .......................... B23H 3/02; B23H 7/14
[52] U.S. Cl. ............................ 204/129.2; 204/129.43; 204/224 M; 204/228; 204/DIG. 9
[58] Field of Search ............. 204/129.2, 129.43, 129.5, 204/129.25, 224 M, 228, DIG. 9

[56] References Cited

U.S. PATENT DOCUMENTS

| | | | |
|---|---|---|---|
| 3,527,686 | 9/1970 | Inoue | 204/224 M |
| 3,607,689 | 9/1971 | Inoue | 204/129.43 |
| 4,097,710 | 6/1978 | Maillet | 204/129.43 X |
| 4,160,710 | 7/1979 | Greenwood | 204/129.25 |
| 4,264,417 | 4/1981 | Vasiliev et al. | 204/129.43 |

Primary Examiner—Donald R. Valentine
Attorney, Agent, or Firm—Armstrong, Nikaido, Marmelstein, Kubovcik & Murray

[57] ABSTRACT

An electrode is positioned to form a predetermined gap between the electrode and a surface of a work, and the electrode and the work are submerged in an electrolyte. Pulses are applied to the electrode to machine the work. The electric energy of the pulse is set in such a manner that the electric energy per unit area is reduced with increase of the area.

3 Claims, 10 Drawing Sheets

```
                                        13a
    ----- RUN

GAP              100 μm
    AREA             25 cm²
    DEPTH            1 μm
    BEFORE           30 μm
    COUNT = 123   TIME 01:23:45
```

ELECTROLYTIC FINISHING METHOD AND APPARATUS

BACKGROUND OF THE INVENTION

The present invention relates to a method for finishing a surface of a work by electrolytic machining, and more particularly to a method for finishing the surface having a three-dimensional shape.

U.S. Pat. Nos. 3,527,686 and 3,607,689 disclose electrolytic machines. In the machine liquid electrolyte is continuously passed between an electrode and a work at a high speed during machining, so that residual products such as particles of eroded metal from the work, hydrogen gas, and others are discharged from the gap between the electrode and the work. However, in the case of the work having a complicated three-dimensional shaped recess, it is impossible to pass the liquid electrolyte through the gap having a complicated shape at a constant speed. The accuracy of the product is greatly influenced by the irregularities in the electrolyte flow. In addition, the concentration of the electrolyte at an outlet of an electrolyte tank is different from the concentration at an inlet, even if the pressure of the liquid is increased. Accordingly, it is impossible to produce accurate products.

Further, it has been found that the roughness of the surface of the product changes with the area of the surface. Accordingly, it is necessary to vary electric energy supplied between an electrode and a work in accordance with the area of the surface to be finished

SUMMARY OF THE INVENTION

The object of the present invention is to provide an electrolytic finishing method which may finish a three-dimensional surface of a work to a product having a lustrous surface with accuracy at high speed.

According to the present invention, there is provided a method for finishing a work including securing the work in an electrolyte tank, positioning an electrode to form a predetermined gap between the electrode and the surface of the work, supplying electrolyte to the electrolyte tank so as to submerge the electrode and the work, applying electric energy in the form of a pulse to the electrode, supplying clean electrolyte to the tank and draining the electrolyte including residual products.

The method comprises setting an area of the work to be finished, and setting the electric energy in such a manner that the electric energy per unit area is reduced with the increase of the area.

In an aspect of the invention, the area is calculated based on a current of the pulse which is detected from the applied pulse.

The other objects and features of this invention will be apparently understood from the following description with reference to the accompanying drawings.

DETAILED DESCRIPTION OF THE PREFERRED EMBODIMENT

Figure 1:
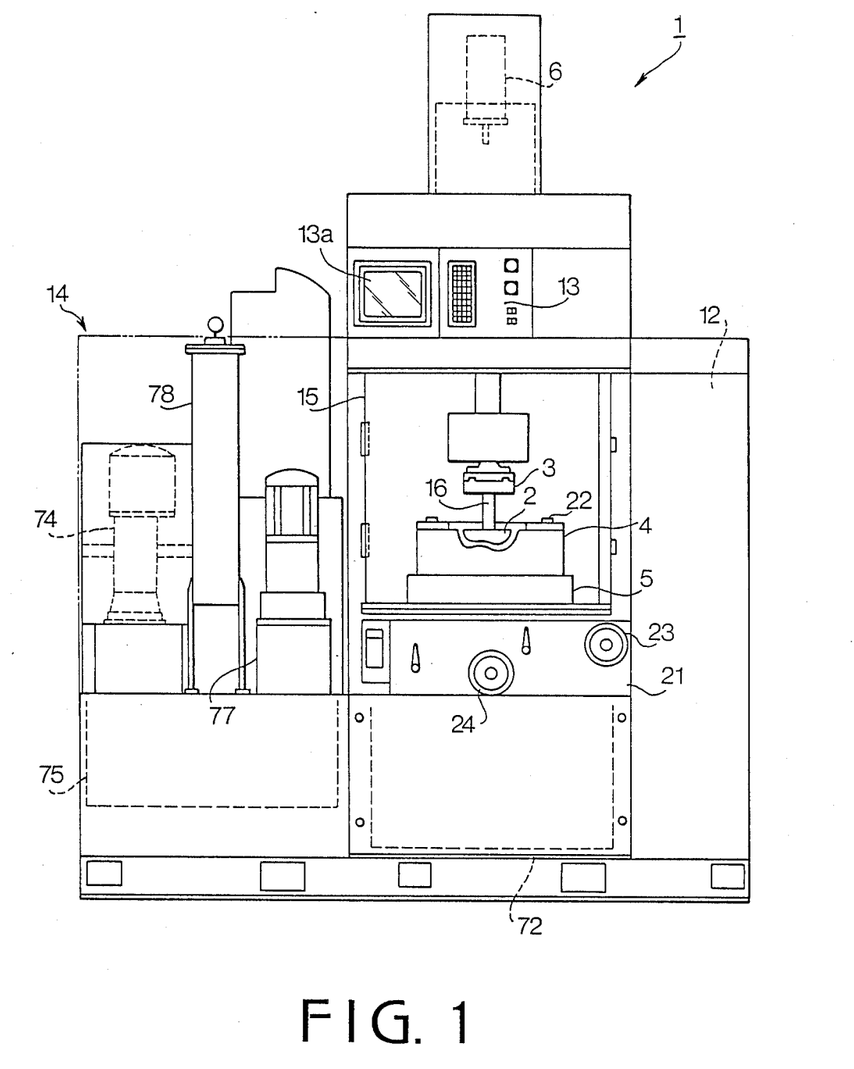
FIG. 1 is a front view of the device to which the present invention is applied.
Figure 2:
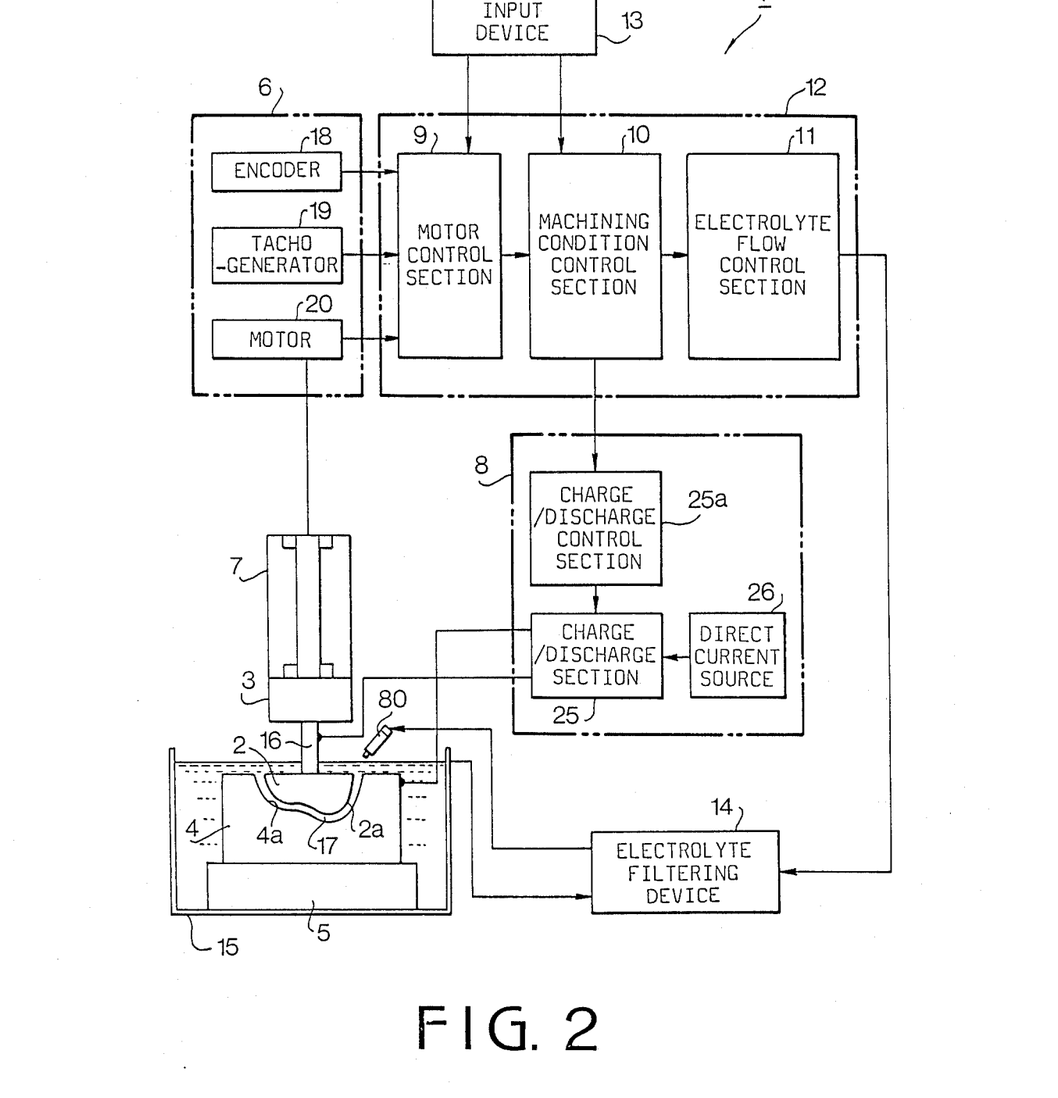
FIG. 2 is a schematic illustration showing a system of an electrolytic finishing machine according to the present invention.

Referring to FIGS. 1 and 2, the electrolytic finishing machine 1 has an electrode holding device 3 for holding an electrode 2, a work fixing device 5 for fixing a work 4 in an electrolyte tank 15. The tank 15 contains electrolyte such as sodium nitrate solution or sodium chloride solution. The electrode 2 made of copper or graphite is secured to the lower end of a rod 16 of an electrode holding device 3. The holding device 3 is operatively connected to an electrode driving device 6 through an electrode driving direction converter 7. The converter 7 is arranged to change rotary output of a motor 20 in the device 6 into axial movement of the rod 16.

The work 4 has a three-dimensional recess 4a to be finished, which has been formed by an electrical discharge machine (not shown) with the electrode 2.

The driving device 6 has a rotary encoder 18, tacho-generator 19 and motor 20. Output signals of the encoder 18 and tacho-generator 19 are supplied to a motor control section 9 of a control unit 12, and motor 20 is operated by a control signal from the motor control section 9. The control unit 12 has a machining condition control section 10 and an electrolyte flow control section 11.

The work fixing device 5 is a table made of insulation such as ceramic material and mounted on an X-Y table 21. The work 4 is secured to the table 5 with bolts 22. The table 21 can be moved in X and Y directions by operating handles 23 and 24.

The system has a power source device 8 which comprises a direct current source 26, a charge/discharge section 25, and a charge/discharge control section 25a for controlling the charge/discharge section 25. The charge/discharge section 25 generates a pulse of a current density (specifically means "peak current density") for a pulse duration dependent on the surface area of the recess 4a, in response to a signal from the machining condition control section 10.

The system further has an input device 13 for inputting machining conditions, and an electrolyte filtering device 14 which will be described hereinafter in detail.

The input device 13 is arranged to input various machining condition signals such as the material of the work, surface area of the work, machining depth, grades of dimension accuracy, surface roughness, and dimension of the gap 17 between the electrode and the work. The signals are fed to the motor control section 9 and the machining condition control section 10.

Figure 3A:
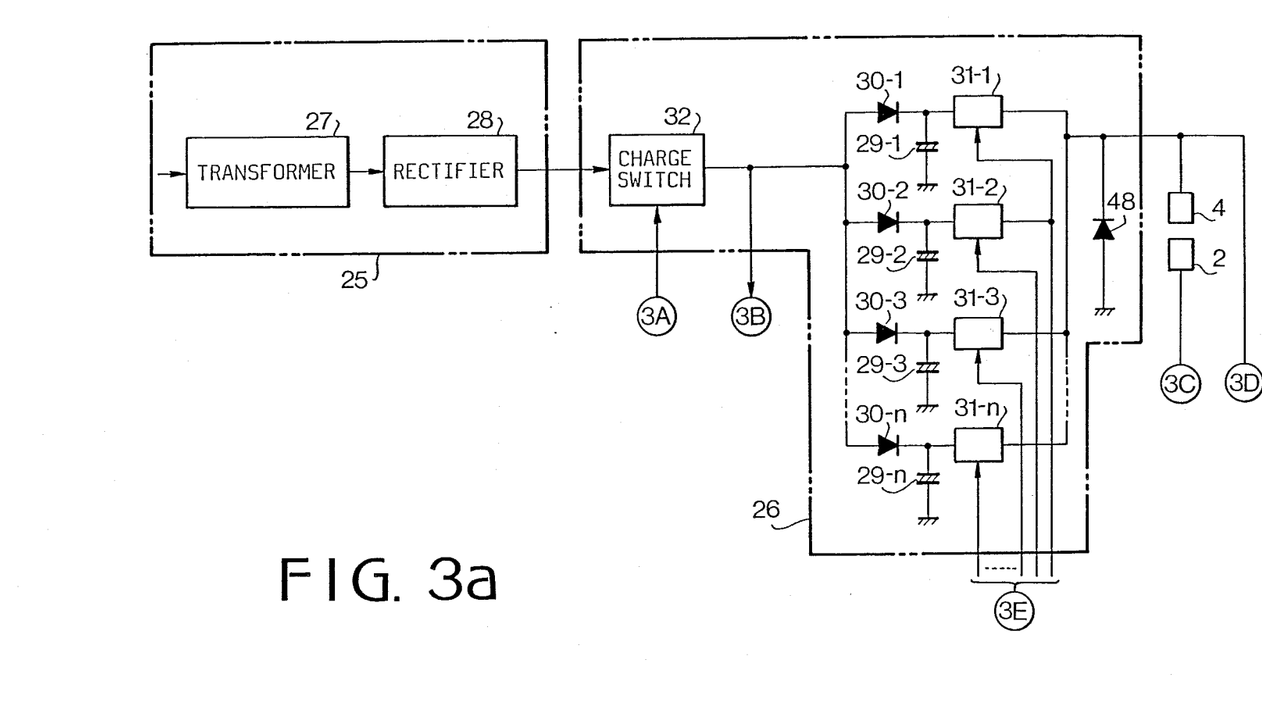
FIGS. 3a and 3b are block diagrams showing a system for supplying current to an electrode and a work.
Figure 3B:
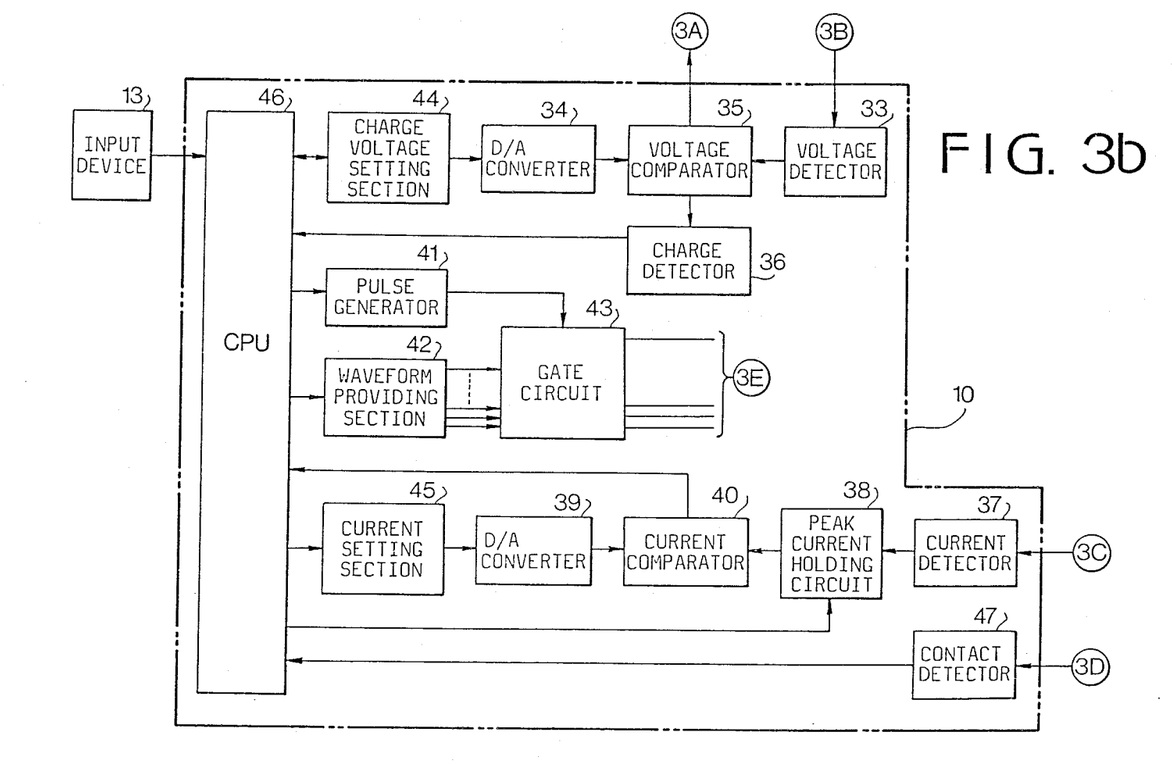

Referring to FIGS. 3a and 3b, direct current source 26 of the power source device 8 comprises a transformer 27 and a rectifier 28.

The charge/discharge section 25 has a plurality of capacitors 29-1 to 29-n which are connected in parallel with each other, diodes 30-1 to 30-n for preventing reverse current to the current source, switches 31-1 to 31-n for generating pulses, and a charge switch 32 responsive to a signal from a voltage comparator 35 for connecting the direct current source 25 to capacitors 29-1 to 29-n to charge each capacitor to a set value.

The machining condition control section 10 comprises CPU 46 applied with signals from the input device 13 to calculate machining and others, a waveform providing section 42 for providing current waveform to be discharged in the gap 17 between the work 4 and the electrode 2, a pulse generator 41 for generating pulses each having a predetermined pulse duration, a charge voltage setting section 44 for setting charge voltage applied to the capacitors 29-1 to 29-n, a current setting section 45, and a D/A converter 39.

A voltage detector 33 is provided for detecting the charge voltage applied to the capacitors 29-1 to 29-n, a voltage comparator 35 is provided for comparing a voltage from a D/A converter 34 corresponding to the charge voltage from setting section 44 with the charge voltage detected by the voltage detector 33, and a charge detector 36 is provided for detecting the completion of charging in response to the output of the comparator 35. The control section 25a further comprises a current detector 37 for detecting the current of the electric charge discharged between the work 4 and the electrode 2, a peak current holding circuit 38 for holding a peak current detected by the detector 37, a current comparator 40 for comparing the peak current from the peak current holding circuit 38 with the current supplied form the D/A converter 39, a gate circuit 43 for supplying an operation signal to switches 31-1 to 31-n in response to signals from pulse generator 41 and waveform providing section 42, and a contact detector 47 for detecting the contact of the electrode 2 with the work 4. There is provided a diode 48 for preventing the switches 31-1 to 31-n from breaking down by reverse current.

In response to a signal supplied from the input device 13, which represents the surface area S of the work 2 and others, the CPU 46 calculates an electric energy at a time for machining (one pulse or several pulses), using a predetermined equation. Further, a peak current density in a supplied pulse necessary to provide the electric energy is calculated. A charge voltage corresponding to the calculated peak current density is calculated and fed to a charge voltage setting section 44 and a peak current density signal is fed to the current setting section 45. An output signal of the section 45 is applied to the current comparator 40 through D/A converter 39.

A predetermined pulse current flows between the work 4 and the electrode 2, the current is detected by the current detector 37, and a peak current thereof is held in the peak current holding circuit 38. The current comparator 40 compares the peak current from the D/A converter 39 with the peak current from the circuit 38 and produces a compared signal which is supplied to the CPU 46. In accordance with the signal, the CPU 46 controls the charge voltage set at the section 44 so a to maintain the peak current density at a predetermined value.

When capacitors 29-1 to 29-n are charged up to a predetermined charge voltage, a charge completion signal is fed to CPU 46 from the charge detector 36. The CPU 46 supplies a control signal to gate circuit 43 through pulse generator 41 and waveform providing section 42 to open the gate. Thus, switches 31-1 to 31-n are selectively closed to discharge capacitors.

Figure 5:
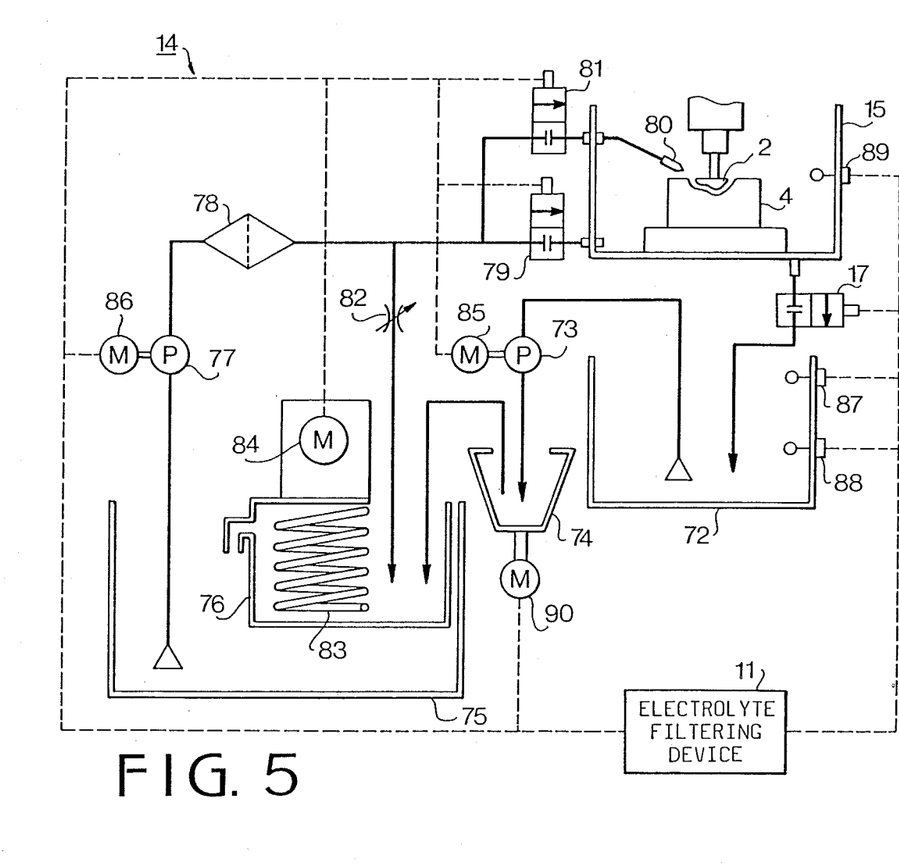
FIG. 5 is a block diagram showing a filtering system for electrolyte solution.

Referring to FIG. 5, the electrolyte filtering device 14 comprises a dirty tank 72 for receiving electrolyte including residual products, which is removed from the electrolyte tank 15 through a solenoid operated valve 71, a centrifugal separator 74 which is driven by a motor 90 to separate the electrolyte fed from dirty tank 72 by a pump 73 driven by a motor 85, a clean tank 75 storing clean electrolyte fed from a centrifugal separator 74, a pump 77 driven by a motor 86 for feeding the electrolyte in the clean tank 75 to the electrolyte tank 15 through a filter 78 and a solenoid operated valve 79 or 81 and an injection nozzle 80. A pair of float switches 87 and 88 are provided for providing an upper and lower limits of electrolyte levels in the dirty tank 72. A float switch 89 is provided on the wall of the tank 15 for detecting the level of the electrolyte. In the clean tank 75, a liquid temperature adjuster 76 having a heater 83 and a fan (not shown) driven by a motor 84 is provided. The electrolyte passing the filter 78 is returned to the clean tank 75 through a control valve 82.

Figure 4:
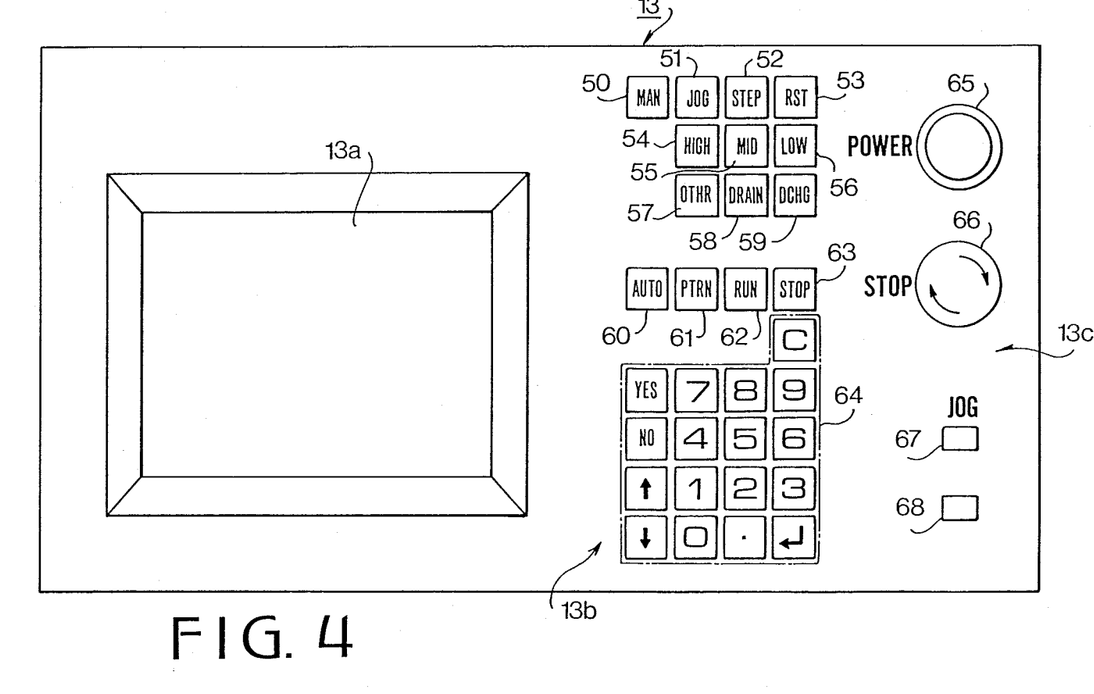
FIG. 4 is a front view of an input device.

Referring to FIG. 4 showing a front view of the input device 13, there are provided a display 13a, key board 13b and operation button section 13c.

The key board 13b has a manual key (MAN) 50 for selecting a manual operation mode which is pushed at centering the electrode 2, draining the electrolyte, and discharging the residual charge; JOG key 51 and STEP KEY 52 for selecting a centering mode for the electrode 2; a reset key (RST) 53 for interrupting and resetting all the operations; HIGH key 54 for setting speed for up and down going the electrode and the distance thereof, which is effected by the combined use of the JOG key 51 and STEP key 52; middle key (MID) key 55; LOW key 56; dither key (DTHR) 57 for raising the electrode 2 when the electrode engages with the work 4 and for lowering the electrode when it disengages the work; DRAIN key 58 for discharging the electrolyte from the tank 15 and for circulating the electrolyte; discharge key (DCHG) 59 for discharging capacitors 29-1 to 29-n; AUTO key 60 for selecting automatic operation; pattern key (PTRN) 61 for selecting an input display necessary for a machining; RUN key 62 for starting the automatic operation; STOP key 63 for stopping the automatic operation; and ten key 64 for inputting various parameters.

The operation button section 13c comprises a power button 65, power off button 66, UP button 67 and DWN button 68. The electrode 2 is continuously raised or lowered as long as the button 67 or 68 is depressed under the condition of the ON of the JOG key 51 and the ON of UP button 67 or DWN button 68, and is fed by a predetermined distance by depressing the button 67 or 68 when STEP key 52 is ON.

Figure 6A:
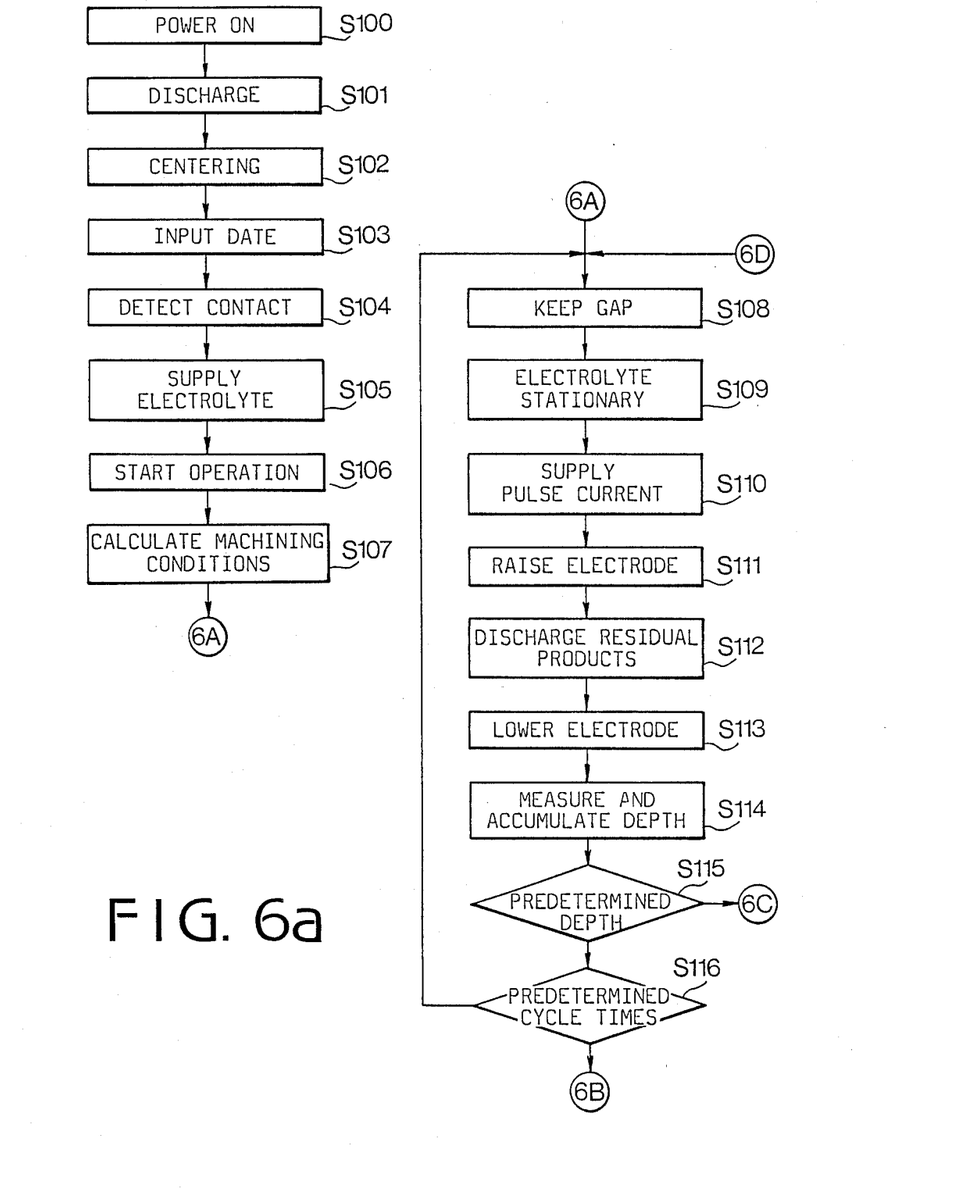
FIGS. 6a and 6b show a flow chart showing an operation of machining method.
Figure 6B:
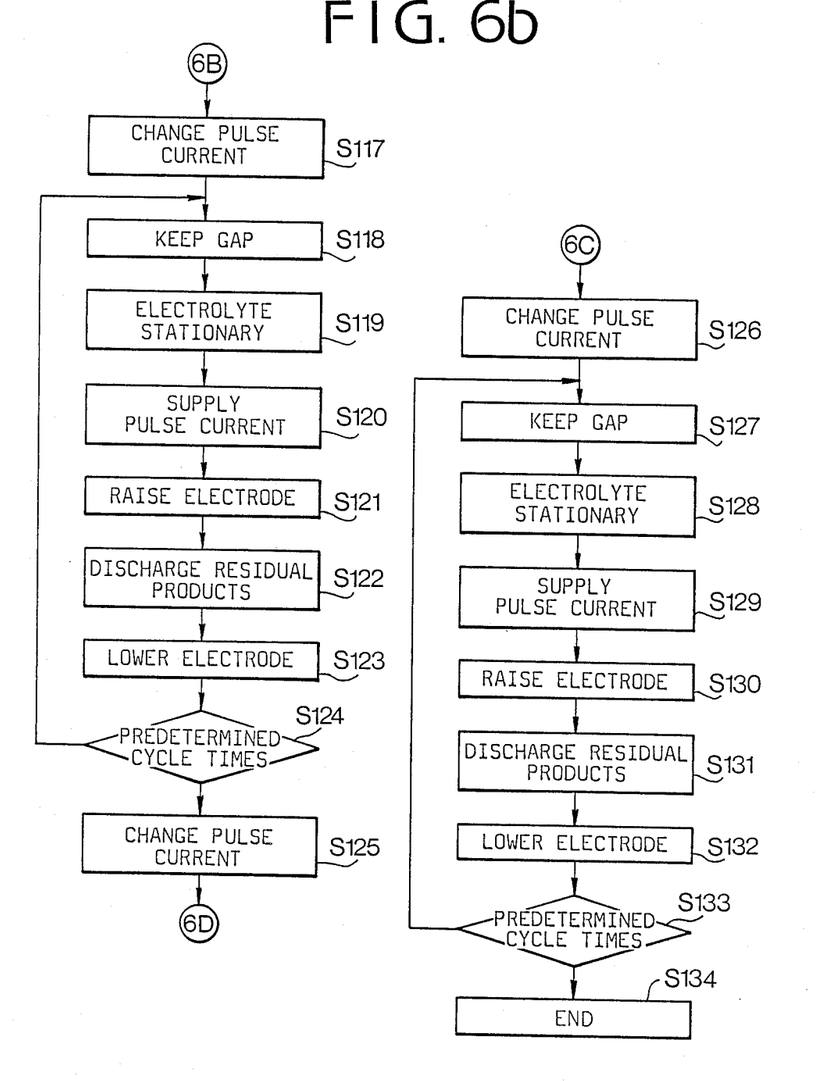

The machining method of the work is described hereinafter with reference to a flow chart of FIGS. 6a and 6b. The electrode 2 which was used at electrical discharge machining for roughly machining the work 4 is attached to the rod 16 and the work 4 is attached to the fixing device 5. The power button 65 is depressed to supply the power (step 100). The DCHG key 59 is depressed to discharge residual charges in capacitors 29-1 to 29-n (step 101). The position of the work 4 is adjusted by operating the X-Y table to align the recess 4a with an electrode surface 2a (step 102).

At a step 103, machining conditions such as the dimension δ of electrode gap 17, surface area S of the work, machining depth, surface roughness, and others are input by the input device 13. When the RUN key 62 is depressed, electrode 2 is lowered to contact with the work 4 (step 104), and the position of the electrode is stored in a memory in the CPU as an original position A. The DRAIN key 58 is depressed to open the valve 59, and the electrolyte in the clean tank 75 is supplied to the tank 15 (step 105). When the level of the electrolyte reaches a predetermined level, the float switch 89 turns on to start the operation (step 106). The CPU 46 calculates the electric energy for the pulse supplied between the electrode and the work, based on the surface area S by using a characteristic table stored in a memory. Further, the charge voltage necessary for the electric energy, the pulse width, the number of times of pulse supply, and others are calculated (step 107). Thereafter, the electrode 2 is raised to provide a predetermined initial gap δ (step 108). When the electrolyte in the gap becomes stationary (step 109), the electrolytic machining is started. A single pulse current (hereinafter called first pulse current) for improving the surface roughness, which has a peak current density $ip_1$ and a pulse width $ton_1$ for providing the necessary electric energy is applied between the electrode and the work (step 110). The current comparator 40 compares the peak current with the current from the D/A converter 39. The CPU 46 calculates a new surface area of the work in dependence on the comparison and produces a voltage signal having a necessary current density for the subsequent machining.

In accordance with experiments conducted by the inventors, a proper electric energy of the first pulse current for the work having the surface area S of 300 cm$^2$ is obtained by peak current density $ip_1 = 15$ A/cm$^2$ and pulse width $ton_1 = 4$ msec, namely $$15(A/cm^2) \times 4(msec) = 0.06 \text{ coulomb/cm}^2.$$

For the work having the surface area 1 cm$^2$, a proper electric energy is $$60(A/cm^2) \times 5(msec) = 0.3 \text{ coulomb/cm}^2$$

It was confirmed that the electric energy is substantially inversely proportional to the work surface area S.

After a predetermined number of pulses are applied, the electrode 2 is raised by the motor 20 to expand the gap (step 111). The solenoid operated valve 81 is opened to inject clean electrolyte from the nozzle 80 to the gap 17, thereby removing the residual products from the gap and the tank 15 (step 112). The electrolyte in the tank 15 is then drained to the dirty tank 72 together with residual products.

After the draining of the electrolyte, the electrode 2 is lowered to contact the work surface 4a (step 113) and the position of the electrode 2 is stored in the memory in the CPU. The stored position is compared with the original position A in the CPU 46, so that the machining depth per one machining cycle (at every one or more pulses) is measured and accumulated (step 114). At a step 115, it is determined whether the difference between the sum of the machining depths and the input depth becomes a predetermined value with respect to the input depth (for example 1 μm), or not. If not, it is determined whether a predetermined time of machining cycles is performed or not (step 116). If the machining cycles are not completed, the program returns to the step 108. Thus, the above described machining (steps 108 to 115) is repeated in accordance with signals from the CPU.

When the machining cycle is repeated predetermined times $N_1$(step 116), the CPU 46 applies a pulse change signal to the charge voltage setting section 44, so that the finishing pulse is changed to a removing pulse having a second pulse current for removing a film including electrolytic products formed on the work 4 (step 117).

The second pulse current has a higher peak current density $ip_2$ (5–10 A/cm$^2$) and a larger pulse width $ton_2$ (10–15 msec) than the first pulse current so as to provide a larger electric energy. Thereafter, the electrode 2 is raised to the same position as the step 108 (step 118). After electrolyte becomes stationary (step 119), one or more second pulse currents are applied to the electrode 2 (step 120) to remove the film. Then the electrode 2 is raised (step 121), and clean electrolyte is injected from the nozzle 80 to discharge the electrolyte in the gap 17, while the electrolyte in the tank 15 is drained together with the film (step 122). Thereafter, the electrode 2 is lowered (step 123) and it is determined whether a predetermined time $N_2$ of machining cycles is performed (step 124). If NOT, the program returns to step 118. If YES, the pulse current is again changed to the first pulse current (step 125) for improving the surface roughness, and the program returns to the step 108.

When the difference between the sum of machining depths and the desired depth becomes smaller than a predetermined value (step 115), the first pulse current is changed to a third pulse for finishing the work to a lustrous surface (step 126). The third pulse has a higher peak current density $ip_3$ (30–50 A/cm$^2$) and a longer pulse width $ton_3$ (20–60 msec) than the first pulse in order to obtain a necessary electric energy. With the third pulse current, electrolytic machining processes 127 to 133 which are the same as the above described machining processes 118 to 124 are performed predetermined times $N_s$ (step 133), so that the finish machining is completed (step 134).

Figure 7:
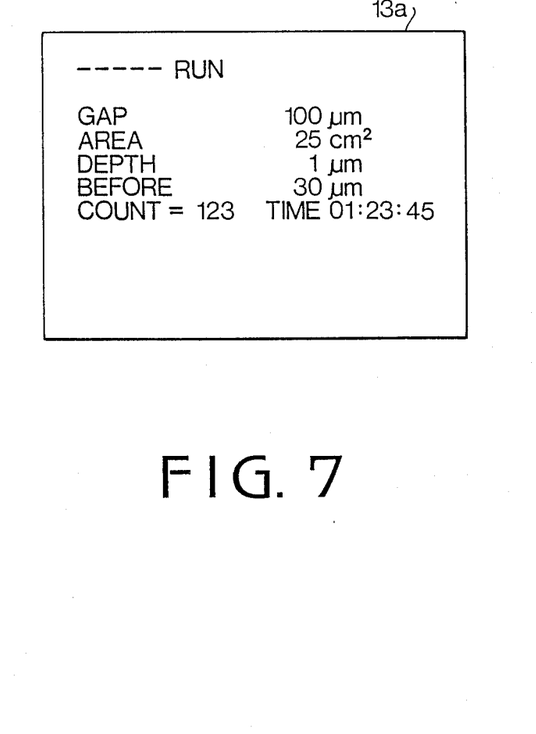
FIG. 7 shows a display.

During the above described operation, the display 13a indicates machining conditions as shown in FIG. 7. Namely, the gap δ (GAP 100 μm), machining area S (AREA 25 cm$^2$), machining depth (DEPTH 1 μm), roughness before machining (BEFORE 30 μm), remaining number of the number of machinings $N_1$ to $N_3$ with respective pulses (COUNT T=123) and machining elapsed time (TIME 01:23:45 ... 1 hour, 25 minutes, 45 seconds) are displayed.

Figure 8:
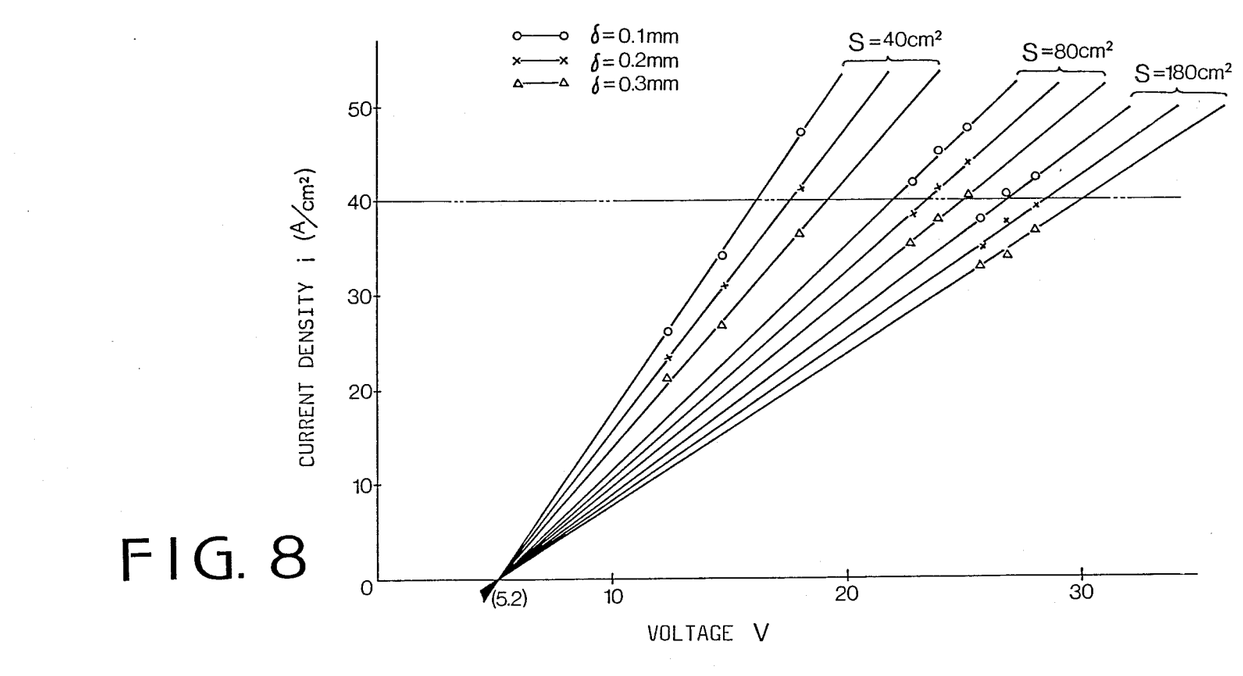
FIG. 8 is a graph showing relationship between voltage and current density.

Although, in the above described method, the initial surface area of the work is input by the input device 13, the area and current density can be otherwise calculated with CPU 46 as described hereinafter. FIG. 8 shows a relationship between the voltage (V) of a pulse and the current density (i), using the area S and the gap δ as parameters. The voltage V is $$V = 5.2 + i/40(1.5S^{0.61} + 15\delta - 5.2) \quad (1)$$

Each value in the equation means as follows.
5.2: value representing that each line does not pass the origin due to polarization by 5.2 V.
40: current density of 40A/cm$^2$ which is usually used.
1.5 and 0.61: values representing the influence of changes in area.
15: value relative to the electrical conductivity of sodium nitrate solution of 40%.

The relationship between area S and current I is $$i = I/S \quad (2)$$

Therefore, $$V = 5.2 + 1.5I/40S^{0.39} + 2\delta I/5S - 5.2I/40S \quad (3)$$

If a pulse having an approximate voltage Vo and a current Io in accordance with an approximate area, which are obtained by CPU 46 in dependence on input data through input device 13, is applied between a preset gap δ and a peak current Io thereof is detected, $$Vo = 5.2 + 1.5 Io/40 S^{0.39} + 2\delta Io/5S - 5.2 Io/40S \qquad (4)$$

Thus, the area S can be calculated by the equation 4. A current Ia necessary for an optimum current density ia is calculated from the equation 2 by using the calculated area S. A voltage Va necessary for obtaining current density ia is calculated by substituting Io in the equation 4 with the calculated current Ia.

A following table is a list of examples for machining method taken place in the following conditions.

| Electrode | Copper |
|---|---|
| Stock | Tool Steel |
| Gap | 0.1 mm |
| Electrolyte | Sodium nitrate solution |

| | (concentration of 40%) | | |
|---|---|---|---|
| | EXAMPLE 1 | EXAMPLE 2 | EXAMPLE 3 |
| Area S | 25 cm² | 1 | 1 |
| Pulse Current | | | |
| $ip_1$ | 20 A/cm² | 60 | 30 |
| $ton_1$ | 5 msec | 5 | 30 |
| $ip_2$ | 30 | 65 | 40 |
| $ton_2$ | 20 | 15 | 45 |
| $ip_3$ | 48 | 48 | 50 |
| $ton_3$ | 40 | 40 | 50 |
| Finished Surface Roughness | R max:1 μm | R max:1 μm | R max:1 μm |
| Finished Surface | Mirror-like Lustrous Surface | Mirror-like Lustrous Surface | Mirror-like Lustrous Surface |

As understood from the table, when the area S is large, for example 300 cm², the machining is performed with a small electric energy, for example 0.06 C/cm². When the area S is small (for example 1 cm²), the electric energy becomes large (for example 0.3 C/cm²).

Thus, the surface roughness can be improved irrespective of the size of the work.

The present invention can be used for finishing works other than the metal work, such as silicon single crystal for manufacturing semiconductors, gallium arsenide stock, and others.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. A method for finishing a work including securing the work in an electrolyte tank, positioning an electrode to form a predetermined gap between the electrode and the surface of the work, supplying electrolyte to the electrolyte tank so as to submerge the electrode and the work, applying electric energy in the form of a pulse to the electrode, supplying clean electrolyte to the tank and draining the electrolyte including residual products, the method comprising:
    setting an area of the work to be finished;
    setting the electric energy in such a manner that the electric energy per unit area is reduced with increase of the area.

2. The method according to claim 1 wherein the area is calculated based on a current of the pulse which is detected from the applied pulse.

3. A system for finishing a work having an electrolyte tank containing electrolyte, an electrode to form a predetermined gap between the electrode and the surface of the work, means for supplying electrolyte to the electrolyte tank so as to submerge the electrode and the work, means for applying electric energy in the form of a pulse to the electrode, means for supplying clean electrolyte to the tank and draining the electrolyte including residual products, the system comprising:
    means for setting an area of the work to be finished;
    means for setting the electric energy in such a manner that the electric energy per unit area is reduced with increase of the area.

* * * * *